J. R. GAMMETER.

AEROSTAT.

APPLICATION FILED FEB. 11, 1913.

Reissued Apr. 1, 1913. 13,548.

Witnesses:
Walter F. Thompson.
Gerald E. Terwilliger

John R. Gammeter Inventor
By his Attorney
Edward Davis

UNITED STATES PATENT OFFICE.

JOHN R. GAMMETER, OF AKRON, OHIO.

AEROSTAT.

13,548. Specification of Reissued Letters Patent. Reissued Apr. 1, 1913.

Original No. 1,047,038, dated December 10, 1912, Serial No. 716,388. Application for reissue filed February 11, 1913. Serial No. 747,813.

*To all whom it may concern:*

Be it known that I, JOHN R. GAMMETER, a citizen of the United States, residing in the city of Akron, county of Summit, and State of Ohio, have invented certain new and useful Improvements in Aerostats, of which the following is a specification.

My invention relates to improvements in air craft and particularly to dirigible balloons.

One feature of my invention provides a flexible but inelastic sheath or envelop for a lighter-than-air machine.

As is well known, there have been many failures and fatalities owing to the fact that the gas confined within the envelop of a balloon, dirigible or otherwise, has been free to alter its volume under the influence of atmospheric conditions.

According to my improved design I provide a sheath or envelop composed of very thin strips of ribbons of metal, such as steel, closely interwoven and inclosing practically the entire gas container, although in the case of dirigibles and the like, metal caps may be used to complete the envelop. Compartments may be formed within the envelop by partitions of like material.

My invention also contemplates novel means for inflating air ships of the lighter-than-air type.

Figure 1:
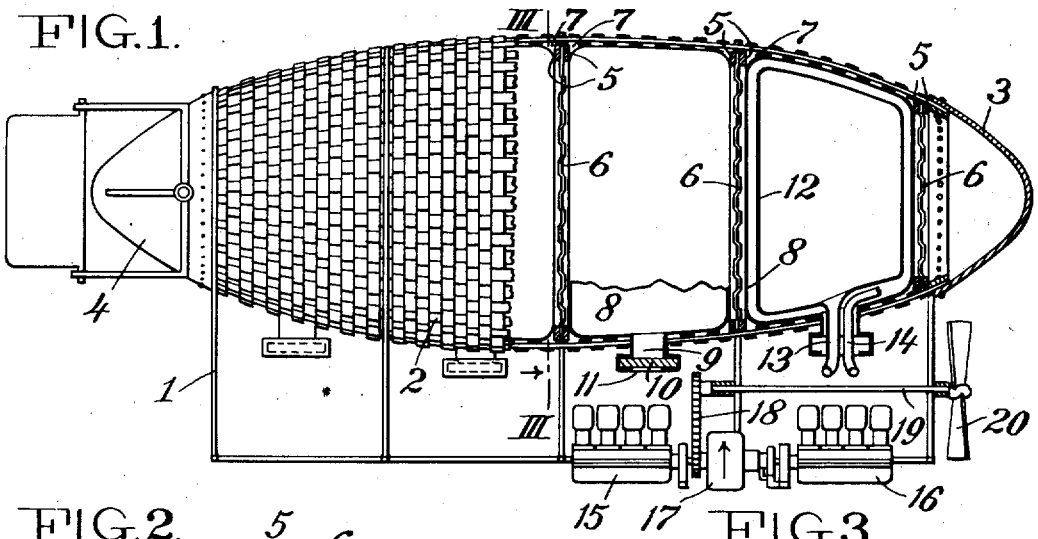
Figure 2:
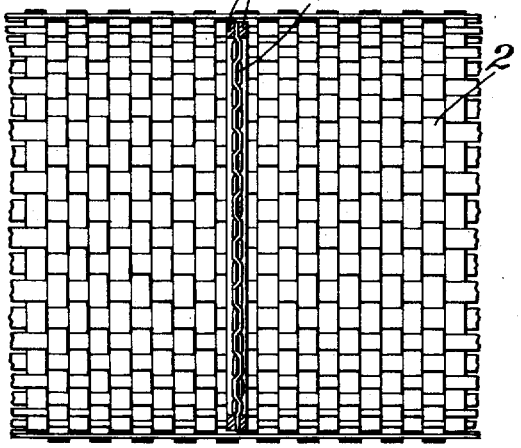
Figure 3:
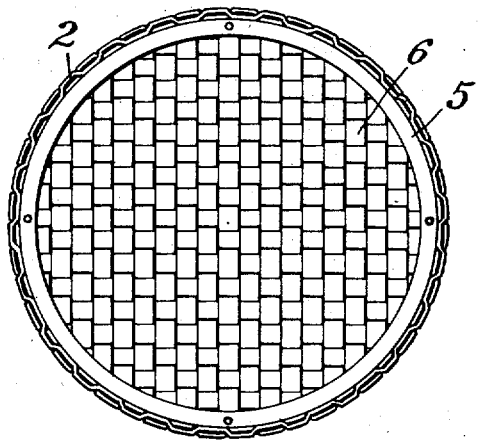
Figure 4:
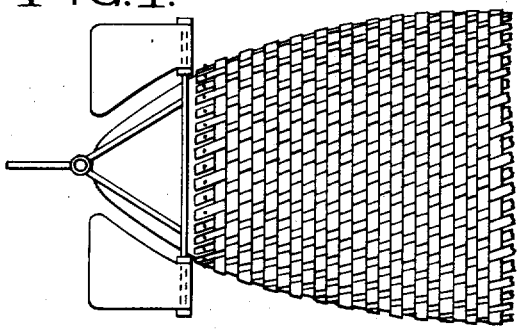
Figure 5:
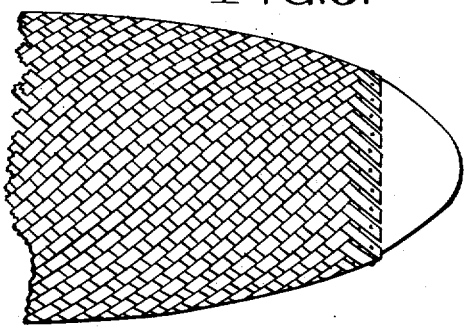

In the accompanying drawings which form a part of this specification, Figure 1 is a side elevation of a dirigible type airship, parts being broken away to show the internal construction; Fig. 2 is a fragmentary longitudinal sectional view of a portion of the envelop; Fig. 3 is a transverse sectional view on line III—III of Fig. 1; Fig. 4 is a side elevation of an envelop showing a modified form of weaving the metallic ribbons composing the same; Fig. 5 illustrates a further modification.

Referring to the drawings in detail, the numeral 1 designates a dirigible airship from which the passenger-carrying frame has been removed for the sake of clearness in showing the operating parts. The structure consists of an envelop 2 of closely woven strips or ribbons of flexible but substantially inextensible material such as steel. This envelop is riveted or otherwise suitably secured at one end to the cone-like tips 3 and 4, which are preferably constructed of aluminum. A strong, inextensible covering is thus produced. The envelop is divided into sections or compartments 7 by pairs of rings 5, which may advantageously be composed of wood, between which are secured partitions 6 of tightly woven material similar to that constituting the envelop. In the drawing I have shown the airship to be divided into six compartments by the use of five of these partitions, but this arrangement may obviously be altered to suit the dictates of individual design.

In Figs. 1 and 2 I have shown the envelop as composed of ribbons extending longitudinally and transversely with respect to the main axis of the structure. In some cases I find it advantageous to weave the fabric comprising the envelop in a spiral form. When this is carried out the longitudinal ribbons may be woven spirally in connection with transverse ribbons as shown in Fig. 4, or both sets may be spiral, as indicated in Fig. 5. Regardless of the manner in which the fabric is woven, there is formed a continuous envelop for inclosing the gas bags which is sufficiently yieldable and flexible in its nature, but which is substantially inextensible and is fireproof. Gas introduced into the containers under pressure may therefore be subsequently chilled, as by atmospheric conditions, and its pressure reduced without an accompanying shrinking in the dimensions of the envelop. A substantially constant lifting value is therefore present in my improved structure. At the same time the weight of the metallic envelop as thus constructed is less than that of many forms of framework or reinforced fabric already in use, and is remarkably light for the degree of strength and safety which it affords. Because of its strength, the gas bags inclosed by it may be constructed of extremely light material.

Each of the compartments 7 is provided with a gas-tight bag or envelop 8 which conforms closely to the walls of its compartment. At the bottom of each gas container I place a valve 9 provided with a gas-tight slide 10 which is adapted to block the aperture 11 of the valve. In filling any compartment with suitable gas, I first introduce a collapsible gas-tight bag 12 into the compartment. This bag is provided with a neck 13 adapted to pass through the valve and afford communication with the exterior of the main envelop. Through this neck I introduce compressed air until the bag occupies all the space within the container, with the exception of that required for an inlet tube 14, which is also introduced through the valve and extends a short distance into the compartment, but which is exterior to the air bag. When the air bag is fully distended, the air supply is shut off and gas is introduced into the compartment through the supply pipe 14. As the volume of the gas increases it will cause a corresponding collapse of the air bag until a point has been reached where the air has been forced out of the air bag and the latter collapsed by the pressure of the surrounding lighter-than-air gas. When this state of affairs occurs, the air bag and the supply pipe 14 may be quickly removed from the compartment, and the valve 9 closed. The use of the air bag prevents a mingling at any time of air and gas within the chamber or compartment so as to form an explosive mixture. The air is driven out at the same rate that the gas is admitted, and the latter may be maintained under any desirable pressure by regulating the pressure at which the air is permitted to escape through the tube 13 during the admission of the gas. By employing this method the person in charge of the inflation of the air-ship is assured that each compartment is filled with gas and gas only.

While I have illustrated and described only certain specific embodiments of my invention, I realize that it is susceptible of wide variation and that the principle thereof may be embodied in many different structures. I do not intend to limit myself to the details of structure shown and described any further than as specified in certain of the more limited claims hereunto appended, but desire to cover my invention broadly.

Having thus described my invention, I claim:

1. An envelop for gas containers for aerostats composed of a fabric woven of metallic ribbons.

2. An envelop for gas containers for aerostats composed of a fabric of tightly woven thin metallic ribbons and presenting substantially no interstices.

3. An envelop for gas containers for aerostats composed of a fabric woven of thin steel ribbons.

4. An envelop for gas containers for aerostats composed of a fabric of tightly woven thin steel ribbons presenting substantially no interstices.

5. An envelop for aerostats comprising a body portion of tightly woven metallic ribbons and end portions of sheet metal.

6. An envelop for aerostats comprising a body portion of tightly woven thin steel ribbons and end portions of sheet metal.

7. An envelop for aerostats comprising a body portion of tightly woven thin steel ribbons and end portions of aluminum.

8. An envelop for aerostats comprising a body portion of tightly woven metallic ribbons, a partition therein of similar fabric and end portions of sheet metal.

9. An envelop for aerostats comprising a body portion of tightly woven thin steel ribbons, a partition therein of similar fabric and end portions of sheet metal.

10. An envelop for aerostats comprising a body portion of tightly woven thin steel ribbons, a partition therein of similar fabric and end portions of aluminum.

11. An envelop for aerostats comprising end portions and a fabric body portion connecting the same having a series of thin metallic ribbons extending from one end to the other, and a second series similar to the first and interwoven therewith.

12. An envelop for aerostats comprising end portions and a fabric body portion connecting the same having a series of thin unitary metallic ribbons extending from one end to the other, and a second series similar to the first and interwoven therewith.

13. An envelop for aerostats comprising end portions and a fabric body portion connecting the same having a series of thin unitary steel ribbons extending from one end to the other, and a second series similar to the first and interwoven therewith.

14. An envelop for aerostats comprising end portions, a fabric body portion connecting the same having a series of thin metallic ribbons extending from one end to the other, and a second series similar to the first and interwoven therewith, a ring transversely mounted within said body portion, and a compartment-forming partition of woven metallic ribbons mounted thereon.

15. An envelop for gas containers for aerostats composed of a fabric woven of ribbons of flexible but substantially inextensible material.

16. An envelop for gas containers for aerostats composed of a fabric of tightly woven thin ribbons of flexible but substantially inextensible material and presenting substantially no interstices.

17. An envelop for aerostats comprising end portions and a fabric body portion connecting the same having a series of thin ribbons of flexible but substantially inextensible material extending from one end to the other, and a second series similar to the first and interwoven therewith.

18. An envelop for aerostats comprising end portions and a fabric body portion connecting the same having a series of thin unitary ribbons of flexible but substantially inextensible material extending from one end to the other, and a second series similar to the first and interwoven therewith.

19. An envelop for aerostats comprising end portions and a fabric body portion connecting the same having a series of thin ribbons of flexible but substantially inextensible material extending from one end to the other, and a second series similar to the first and interwoven therewith, a ring transversely mounted within said body portion and a compartment-forming partition mounted thereon.

20. An envelop for aerostats comprising a body portion of spirally woven ribbons of flexible but substantially inextensible material and end portions of sheet metal.

21. An envelop for gas containers for aerostats composed of a fabric of spirally woven ribbons of flexible but substantially inextensible material and presenting substantially no interstices.

JOHN R. GAMMETER.

Witnesses:
ROBERT M. PIERSON,
HARVEY MUSSER.